(No Model.)
J. W. HYATT.
FILTER.
No. 293,744. Patented Feb. 19, 1884.
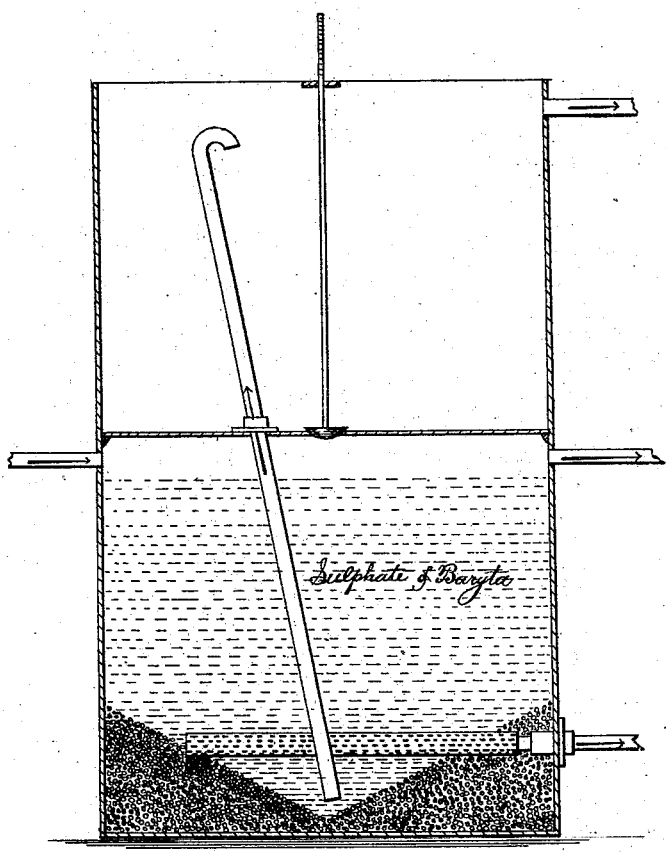
WITNESSES:
Herman Gustow
Chas Phelps
INVENTOR
John W. Hyatt,
BY
Chas C. Gill
ATTORNEY

UNITED STATES PATENT OFFICE.

JOHN W. HYATT, OF NEWARK, NEW JERSEY.

FILTER.

SPECIFICATION forming part of Letters Patent No. 293,744, dated February 19, 1884.

Application filed August 21, 1883. (No model.)

*To all whom it may concern:*

Be it known that I, JOHN W. HYATT, a citizen of the United States, and a resident of Newark, in the county of Essex and State of New Jersey, have invented certain new and useful Improvements in Filters, of which the following is a specification.

The invention relates to improvements in filters; and it consists in a filter-bed composed, essentially, of natural sulphate of baryta or heavy-spar in comminuted form.

The invention may be employed in connection with filtering apparatus of any description wherein a bed of filtering medium is employed. I have used it with particularly satisfactory results in a filter constructed according to the principle described in Letters Patent No. 273,542, granted to me March 6, 1883, said filter being illustrated in section in the accompanying drawing.

I have discovered that a bed of comminuted sulphate of baryta or heavy-spar will effectually arrest silt and other foreign matter from water or other liquids passing through it. The form of the particles of sulphate of baryta is specially adapted to detain the impurities, and I have found that they may readily be cleansed. They are indissoluble in water and of superior specific gravity. This latter quality is of the greatest importance in filters in which the bed is cleansed by transferring its elements, together with a current of water, from the lower to the upper compartment of the filter through a transfer-pipe, and permitting the waste water to escape with the impurities.

In filters of this description it is possible that some of the finer elements of the filter-bed, when the same is composed of sand, coke, &c., will escape with the waste water and impurities; but when a bed of comminuted sulphate of baryta is employed, the superior specific gravity thereof will offer greater resistance to the outflowing current, thus preventing any waste of the filtering medium, but at the same time permitting the free escape of the impurities.

What I claim as my invention, and desire to secure by Letters Patent, is—

A filter-bed consisting, essentially, of natural sulphate of baryta or heavy-spar in comminuted form, substantially as set forth.

Signed at New York, in the county of New York and State of New York, this 14th day of August, A. D. 1883.

JOHN W. HYATT.

Witnesses:
CHAS. C. GILL,
HERMAN GUSTOW.